United States Patent [19]

Julinot

[11] 4,016,677
[45] Apr. 12, 1977

[54] AIR PULSED HYDROPONIC UNIT

[76] Inventor: Helmut Julinot, 3455 Havenwood Ave., House 30, Mississauga, Ontario, Canada

[22] Filed: May 7, 1975

[21] Appl. No.: 575,124

[52] U.S. Cl. .................................. 47/64; 47/80
[51] Int. Cl.² ................................... A01G 31/00
[58] Field of Search ............ 47/1.2, 38, 38.1, 48.5

[56] References Cited
UNITED STATES PATENTS 2,306,027   12/1942   Swaney ........................ 47/38.1

Primary Examiner—Edgar S. Burr
Assistant Examiner—James R. Feyrer
Attorney, Agent, or Firm—Westell & Hanley

[57] ABSTRACT

Disclosed is a portable hydroponic unit comprising a nutrient containing trough which supports an plant supporting aggregate filled tray. Liquid nutrient is carried to the aggregate through an upwardly directed conduit, with apertures in the aggregate, by air bubbles supplied at the conduit lower open end by an air source.

1 Claim, 4 Drawing Figures

AIR PULSED HYDROPONIC UNIT

This invention is directed to a hydroponic unit, which may conveniently act as a portable hydroponic unit.

Hydroponic devices for growing vegetables, fruits, plants, and other horticultural products are well known. Most desirably such units contain a growing chamber containing aggregate in which the horticultural product is grown, and continuously or periodically, there is introduced into this chamber a nutrient solution which supplies nourishment for the product in an amount sufficient to wet the aggregate, and then the excess nutrient solution is allowed to drain out of the growing chamber.

The varieties of aggregate are already well known in the hydroponics art. They are usually chosen to be chemically inert and may or may not be water retentive.

The characteristics and qualities of nutrient solutions are also already well known. These contain mineral salts and other substances suitable for horticulture or agriculture. It has been suggested that the nutrient solution be introduced at the top of the aggregate, into the aggregate and from the bottom of the aggregate. In order to minimize disease, the growth of algae at the top of the surface of the aggregate, and the disturbance of the growing product, it is preferable not to introduce the nutrient solution from the top of the growing chamber, but rather into the middle or to the bottom of the growing chamber, and it is to this type of unit to which the present invention is directed.

Introduction of the nutrient solution at the bottom of the growing chamber has been disclosed in U.S. Pat. No. 2,983,076 (Morill) and also in a U.S. Pat. No. 2,241,699 mentioned in the U.S. Pat. No. 3,323,253 (Robins). In these patents the growing chamber sits on top of a reservoir and nutrient solution is pumped upwards into the growing chamber by increasing the air pressure in the reservoir thus to force the solution into the growing chamber. This, of course, requires the reservoir to be substantially air-tight so that the air pressure in the reservoir may actually rise to force the solution upward.

As a result, such a structure is expensive to manufacture and operate, and it is also not possible to inspect the state of the nutrient solution easily.

The nutrient solution is also introduced at the bottom in U.S. Pat. No. 2,870,574 (Sheridan) in which the growing chamber sits on top of a compressible reservoir containing the nutrient solution. The inventor suggests that this reservoir, which would be made of plastic or rubber, be manually squeezed to force the nutrient solution upwards into the growing chamber. First, this is feasible only for very small growing chambers, such as flower pots, and second, the danger of leakage of the flexible, compressible reservoir is always present, a special disadvantage when such planter units are intended for the home.

Introduction of the nutrient solution at the bottom of the growing chamber has also been disclosed in U.S. Pat. Nos. 3,323,353 (Robins) and 3,451,162 (Rasmussen). In each of these inventions, pumps are provided to force the liquid from the reservoir upwards into the growing chamber, to drain down again after operation of the pump has stopped.

This means that the impeller of the pump is always submerged in the nutrient solution, and so is a seal and one bearing of the impeller shaft. This has been found to be a disadvantage in practice in many cases for a number of reasons. The nutrient solution may have corrosive properties due to the different mineral salts which compose it, and may thus attack the impeller and the shafts as well as the adjacent seal and bearing. Secondly, the nutrient solution tends to pick up small particles of aggregate which may become lodged between the impeller of the pump and the wall, and this may cause the pump to stall.

In the case of the invention disclosed by Robins, both impeller and motor are at a level substantially below the surface of the liquid in the reservoir, and any leakage which may develop through the shaft seal of the pump would permit the nutrient solution to get into the electric motor with resulting corrosion, electrical short circuits, etc.

The two-above mentioned inventions also require extensive 'plumbing' in their internal construction, which is expensive to manufacture and to maintain.

It is an object of my invention to provide a hydroponics planter which does not require the use of hermetically sealed vessels of any sort.

It is a further object of my invention to provide a hydroponics planter which is not compressible and thus does not require fragile membranes or flexible materials.

It is a further object of my invention to provide a hydroponics planter which introduces the nutrient solution into the growing chamber without the use of mechanical impellers substantially submerged in the liquid.

It is a further object of my invention to provide a hydroponics planter, a number of which may be used together while operated from the same control device permitting the addition of additional planters to an existing system in a 'modular' fashion.

It is a further object of my invention to provide a hydroponics device having a reservoir for nutrient solution comprising a liquid container, and in combination with a support, designed to support aggregate (preferably water retentive) above a predetermined liquid level in the container. A liquid conduit is provided having one end in the reservoir below said predetermined level and the other end providing for the exit of liquid therefrom to said aggregate. Means are provided for introducing pulses of air into the lower portion of the conduit so that such pulses will rise as bubbles carrying nutrient solution from the reservoir to the aggregate. The conduit diameter is selected so that the bubble will fill the tube and carry water thereabove in rising. Thus a train of air bubbles rises in the conduit trapping between them an amount of nutrient solution which they carry upward into the aggregate. The size and frequency of air bubbles may be regulated for best results.

The flow of air bubbles and entrapped liquid rises up into the upper end of the irrigation tube which is buried in the aggregate where it exits through the orifices, with the nutrient solution wetting the aggregate and the air rising out of the aggregate. In this manner, together with the preferred water-retentive qualities of the aggregate, all the aggregate is kept wet with nutrient solution and forms an ideal growing medium for the horticultural product.

It is noted that if, as is preferred, the aggregate is water retentive in the sense that it will carry the nutrient solution by capillary action; then a few apertures in the upper end of the conduit will allow liquid to spread widely through the nutrient solution and above and below the exit from the conduit. On the other hand an aggregate with low water retentivity will require more apertures in the liquid conduit to allow a proper distribution of the nutrient solution through the aggregate and the lack of capillarity in the non-retentive aggregate will substantially imply that nutrient solution will only be distributed below the exit from the conduit, and the height of the exits from the conduit must be selected accordingly.

It should be noted that the air may be allowed to escape through the water exits from the conduit. However, it will also be noted that if the water exits are too small there may occur a tendency for back pressure to build up in the conduit tending to inhibit the upward flow of the bubbles and air. For this reason it is preferred to provide a wide air exit from the upper end of the conduit at a location when the drop in air pressure will not interfere with the distributing of liquid to the desired orifices.

The air escaping through the orifice also acts to aerate the soil to some degree.

The device has many advantages over the prior art. No liquid pumps or sealed bearings are required. No hermetically sealed reservoir is required. The intermittent source of air may be a relatively low pressure electric vibrator pump. Failure of the air supply or leakage in the air hose or irrigation tube will cause no damage to the remaining equipment or liquid leakage to the outside.

In drawings which illustrate preferred embodiments of the invention:

Figure 1:
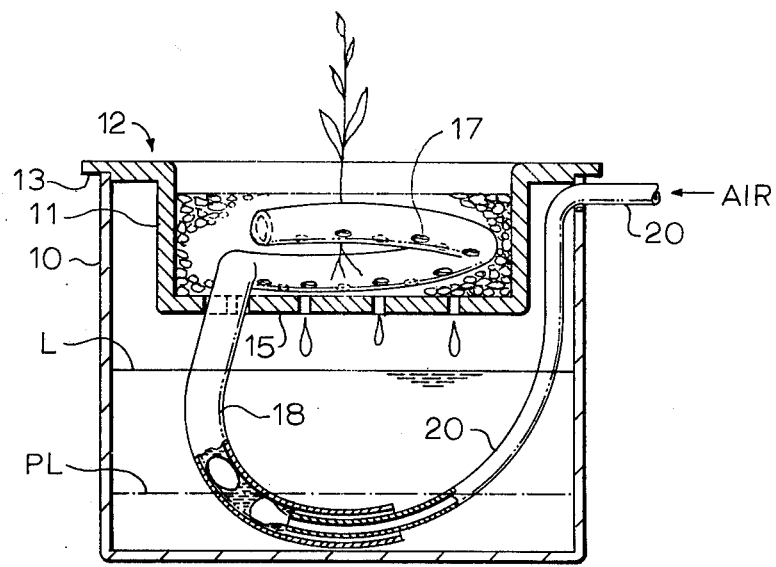
FIG. 1 shows a vertical cross-section of a preferred embodiment of the invention.

FIG. 1 shows an open tapped reservoir 10 for containing liquid nutrient which may be supplied thereto either manually or by pump. The reservoir is designed to be filled with nutrient liquid between a predetermined level PL and a maximum level L. An aggregate container 12 is shaped to have its bottom 15 received in reservoir 10. The container is provided with side walls 11 having at their upper edge outwardly turned flanges 13 designed to rest on the upper edge of reservoir 10 and to support the aggregate above the maximum level in the reservoir. The bottom 15 of container 12 is apertured to allow drainage of liquid from the aggregate into the reservoir but to allow only small amounts of aggregate therethrough. It will be obvious, from the description to follow that a small amount of aggregate in the reservoir does not interfere with the operation.

A liquid conduit 18 is provided having an open end in the reservoir below level PL and extending upwardly through an aperture in the bottom 15 into an end embedded in the aggregate. The portion of conduit 18 embedded in the aggregate is apertured to allow the escape of nutrient fluid from the conduit at locations where it is desired to spread nutrient liquid in the aggregate. The upper end of the conduit is preferably open as described in the introduction.

Also as discussed in the introduction, if a liquid retentive, i.e. capillary aggregate is used the nutrient solution from an aperture in the conduit will spread widely, not only downwardly but upwardly and laterally. Thus where a water retentive aggregate is used fewer apertures 17 are required and these need not be at the highest level desired for wetting by the nutrient solution. On the other hand where (or to the extent that) the aggregate is not water retentive the irrigated areas will be cones in the aggregate widening downwardly from the aperture 17. Thus the conduit in the alternative would have to be at the highest level where irrigation is desired.

An air pipe 20 is provided connected to a source of air (not shown) and having open end directed into conduit 18 at a location where bubbles of air released from conduit 18 will rise in the conduit to the aggregate embedded portion.

The air source is controlled to provide a train of bubbles rising in the conduit 18 carrying nutrient fluid therewith. The conduit should be larger than capillary size and its cross sectional size is limited by the fact that the bubbles must extend across the conduit. Since the size that the bubbles can achieve in extending across a conduit is a function of the surface tension, the size will vary with the constituency of the nutrient solution and the temperature. However, we find that a conduit of 5/16 inch cross-section works well and it is doubtful if proper results can be achieved with a conduit size of ½ inch or larger.

As shown the air from air pipe 20 may be introduced into the lower end of the conduit 18 through the open end or could be introduced through an aperture in the wall of the upwardly extending portion of the conduit 18.

Although the preferred embodiment shows an aggregate container seated over the reservoir it will be noted that this is not necessary within the scope of the invention. It is only necessary that the aggregate container be located higher than the reservoir and that members be connected by the bubble carrying conduit 18. It follows that one reservoir may serve a number of aggregate containers, connected to each one by a bubble carrying conduit. It is desirable that the the nutrient solution draining from the aggregate containers be re-used and thus that a drainage connection would be preferably provided to the reservoir.

Figures 2, 3:
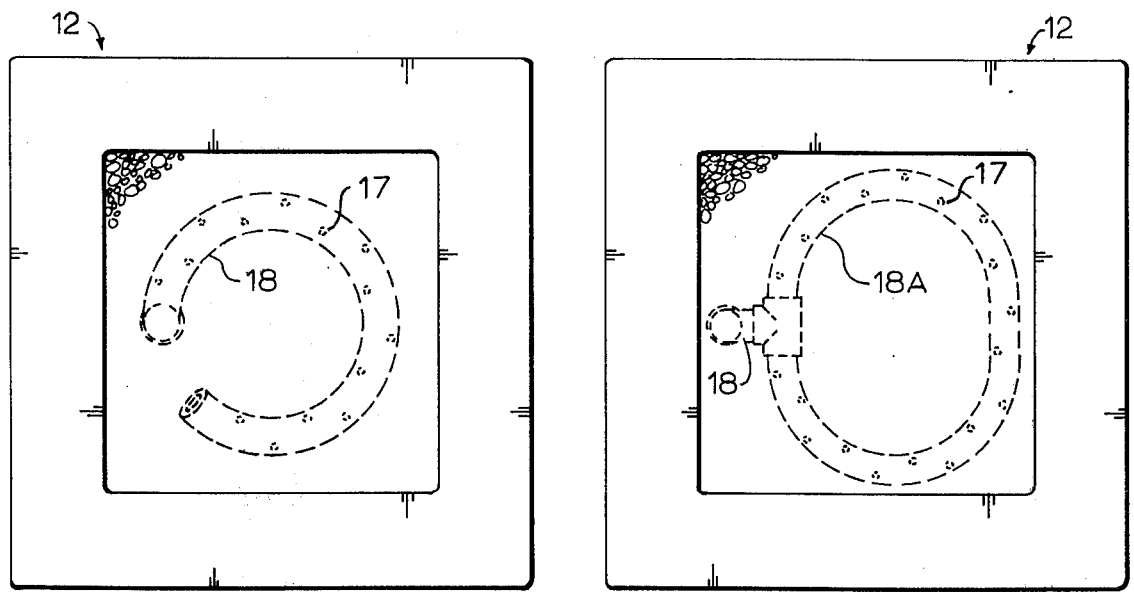
FIG. 2 shows a top view of a preferred embodiment of the invention.
FIG. 3 shows an alternative to the embodiment shown in FIG. 2.
Figure 4:
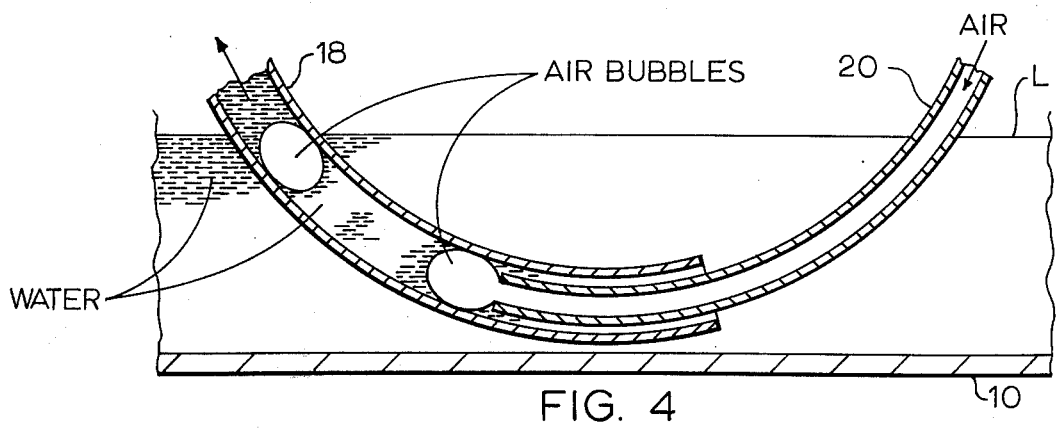
FIG. 4 shows an enlarged detail of FIG. 1.

FIG. 3 merely shows an alternative to the preferred embodiment where the upper end of conduit 18 is a closed 'doughnut' 18A with apertures 17a allowing escape of the liquid.

In operation adjustment of the supply of air in pulses along conduit 19 provides a train of bubbles in the conduit 18 (in either embodiment) and carrying nutrient solution into the aggregate to irrigate it. When the level of nutrient solution falls to level PL it may be topped up to level L.

I claim:

1. A hydroponic unit comprising:
   a tray for holding aggregate;
   at least one drainage aperture in said tray;
   a reservoir for nutrient solution arranged to hold nutrient solution between a predetermined lower level and a predetermined upper level;
   said upper level being below the level of aggregate in said tray;
   said reservoir being located to receive liquid passing downwardly through said drainage aperture;
   a liquid conduit having a lower end open in the reservoir below said lower predetermined level, and an upper end having at least one aperture opening into said tray;
said liquid conduit including an extent continuously rising from below said lower predetermined level to a location as high as said at least one aperture which opens into said tray;
the cross-section of said liquid conduit being chosen so that air bubbles may extend across the cross-section of the tube;
an air conduit introduced into the liquid conduit through the lower open end of the liquid conduit, said air conduit having an open end located in said liquid conduit below said lower predetermined level in a portion of said continuously rising extent whereby bubbles created by air released by the air conduit, rise in said extent.

* * * * *